(12) United States Patent
Auffret et al.

(10) Patent No.: US 11,711,460 B2
(45) Date of Patent: Jul. 25, 2023

(54) METHOD AND DEVICE FOR MANAGING INCOMING CALLS IN A COMMUNICATION TERMINAL

(71) Applicant: Orange, Paris (FR)

(72) Inventors: Jean-Marc Auffret, Châtillon (FR); Aurélien Guillou, Châtillon (FR); Olivier Cleuziou, Châtillon (FR); Jean-François Jestin, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/217,336

(22) Filed: Mar. 30, 2021

(65) Prior Publication Data
US 2021/0306452 A1      Sep. 30, 2021

(30) Foreign Application Priority Data
Mar. 31, 2020   (FR) ...................................... 2003165

(51) Int. Cl.
*H04M 3/22* (2006.01)
*H04M 1/57* (2006.01)
*H04M 3/436* (2006.01)

(52) U.S. Cl.
CPC ......... *H04M 3/2281* (2013.01); *H04M 1/571* (2013.01); *H04M 1/573* (2013.01); *H04M 3/436* (2013.01)

(58) Field of Classification Search
CPC .... H04M 3/2281; H04M 1/571; H04M 1/573; H04M 3/436; H04M 1/57; H04M 1/663; H04M 15/47; H04M 3/42059; H04M 2203/6027; H04M 2215/0148; H04M 3/42042; H04M 3/42221; H04M 3/2218; H04M 3/4365; H04M 3/42102; H04M 2203/6045

See application file for complete search history.

(56) References Cited

U.S. PATENT DOCUMENTS

| 5,003,595 A | * | 3/1991 | Collins | .................... H04Q 3/72 379/198 |
| 5,949,871 A | * | 9/1999 | Kabay | ................... H04Q 3/0029 379/230 |
| 6,418,212 B1 | * | 7/2002 | Harrison | ............... H04M 15/00 379/189 |
| 6,549,613 B1 | * | 4/2003 | Dikmen | .............. H04M 3/2281 379/221.09 |

(Continued)

OTHER PUBLICATIONS

French Search Report and Written Opinion dated Nov. 25, 2020 for Application No. 2003165.

*Primary Examiner* — Akelaw Teshale
(74) *Attorney, Agent, or Firm* — Knobbe, Martens, Olson & Bear, LLP (57) ABSTRACT

A method for managing an incoming call in a communication terminal is described, the incoming call having an associated call identifier. The method can comprise checking the routing of an outgoing call to the call identifier associated with the incoming call, and classifying the incoming call on the basis of the result of the checking of the routing, the incoming call being classified as a malicious incoming call if the checking of the routing reveals that the outgoing call is not able to be routed. The method can be used, for example, to detect malicious calls or spam.

11 Claims, 3 Drawing Sheets

(56) References Cited

U.S. PATENT DOCUMENTS

| | | | |
|---|---|---|---|
| 6,574,317 B1* | 6/2003 | de Freitas | H04M 15/00 379/120 |
| 6,631,188 B1* | 10/2003 | Sands | H04M 3/436 379/215.01 |
| 7,003,080 B1* | 2/2006 | Doskow | H04L 63/14 379/112.01 |
| 7,327,837 B1* | 2/2008 | Harlow | H04M 3/2281 379/221.09 |
| 8,565,405 B2* | 10/2013 | Partington | H04M 1/72457 379/419 |
| 8,774,379 B1* | 7/2014 | Youngs | H04W 12/126 379/142.04 |
| 9,277,049 B1† | 3/2016 | Danis | |
| 10,313,511 B1* | 6/2019 | Jiron | H04M 3/2281 |
| 10,484,532 B1* | 11/2019 | Newman | H04W 12/12 |
| 10,523,814 B1* | 12/2019 | Moore | H04M 3/493 |
| 10,542,137 B1* | 1/2020 | Sial | H04M 1/571 |
| 10,554,821 B1* | 2/2020 | Koster | H04M 3/436 |
| 10,582,043 B1* | 3/2020 | Eichhorn | H04M 1/575 |
| 10,601,986 B1* | 3/2020 | Botner | H04M 3/4365 |
| 10,616,411 B1* | 4/2020 | Chang | H04M 3/2281 |
| 10,666,793 B1* | 5/2020 | Gardner | H04M 3/385 |
| 10,681,206 B1* | 6/2020 | Kreiner | H04M 3/42042 |
| 10,721,350 B1* | 7/2020 | Maiorana | G06N 3/08 |
| 10,750,010 B1* | 8/2020 | Fowler | H04L 65/1069 |
| 10,812,511 B2* | 10/2020 | Bihannic | H04L 63/1425 |
| 10,887,457 B1* | 1/2021 | Degeorgis | H04M 3/4365 |
| 10,924,609 B1* | 2/2021 | Piscopo, Jr. | H04M 3/42102 |
| 10,938,982 B1* | 3/2021 | Merchant | H04M 3/42059 |
| 10,958,779 B1* | 3/2021 | Rule | H04M 3/54 |
| 10,979,565 B1* | 4/2021 | Piscopo, Jr. | H04W 80/10 |
| 11,184,480 B2* | 11/2021 | Bidulock | H04M 3/42059 |
| 11,290,503 B1* | 3/2022 | Botner | H04L 65/1079 |
| 11,354,409 B1* | 6/2022 | Kenefick | G06F 21/51 |
| 11,368,583 B1* | 6/2022 | Botner | H04L 65/1104 |
| 2008/0101571 A1* | 5/2008 | Harlow | H04M 3/2281 379/189 |
| 2009/0274143 A1* | 11/2009 | Garg | H04M 3/436 370/352 |
| 2012/0072453 A1* | 3/2012 | Guerra | G06F 21/32 707/E17.014 |
| 2013/0336169 A1* | 12/2013 | Tai | H04L 51/212 370/259 |
| 2015/0358459 A1* | 12/2015 | Spievak | H04M 3/2281 379/201.12 |
| 2015/0379562 A1* | 12/2015 | Spievak | G06Q 10/0639 379/265.09 |
| 2016/0316049 A1* | 10/2016 | Byrne | H04M 3/42314 |
| 2017/0163803 A1* | 6/2017 | Russell | H04L 65/1076 |
| 2018/0013881 A1* | 1/2018 | Cooper | H04M 3/493 |
| 2018/0041631 A1* | 2/2018 | Douglas | H04M 3/2254 |
| 2019/0141183 A1* | 5/2019 | Chandrasekaran | G06N 5/01 |
| 2019/0174000 A1* | 6/2019 | Bharrat | H04M 3/42059 |
| 2019/0335036 A1* | 10/2019 | Sharpe | H04M 15/56 |
| 2019/0394331 A1* | 12/2019 | Benlolo | H04M 3/42059 |
| 2020/0053568 A1 | 2/2020 | Filart | |
| 2020/0169635 A1* | 5/2020 | Bidulock | H04M 3/436 |
| 2020/0322483 A1* | 10/2020 | Anand | H04M 3/543 |
| 2020/0366787 A1* | 11/2020 | Sharpe | H04M 15/56 |
| 2020/0374322 A1* | 11/2020 | Khawaja | H04M 15/66 |
| 2020/0396331 A1* | 12/2020 | Gupta | H04L 63/18 |
| 2021/0203779 A1* | 7/2021 | Piscopo, Jr. | H04L 61/4523 |
| 2021/0234960 A1* | 7/2021 | Piscopo, Jr. | H04M 3/5158 |
| 2021/0306452 A1* | 9/2021 | Auffret | H04M 3/436 |
| 2021/0360402 A1* | 11/2021 | Powers | H04L 9/3268 |

\* cited by examiner
† cited by third party

METHOD AND DEVICE FOR MANAGING INCOMING CALLS IN A COMMUNICATION TERMINAL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 2003165, filed Mar. 31, 2020, the disclosure of which is hereby incorporated by reference in its entirety.

BACKGROUND

Technical Field

The disclosed technology relates to a method for managing incoming calls in a communication terminal. In particular embodiments, the disclosed technology relates to a device for managing incoming calls in a communication terminal, and to a communication terminal. The disclosed technology is applicable in communications between communication terminals, such as telephony terminals.

Description of Related Technology

Telephony terminals, whether landline or mobile, are nowadays increasingly receiving malicious calls, known as spam.

Certain "anti-spam" services can provide solutions for rejecting malicious calls or spam calls intended for a telephony terminal.

One example of an anti-spam service consists in checking whether the identifier or number of an incoming call is present in a database listing identifiers or call numbers corresponding to spam-generating callers. The call identifier is a unique identifier associated with the communication terminal for identifying the communication terminal in a landline or mobile network of an operator.

This type of database listing call identifiers corresponding to spam generators can be updated through feedback from users of telephony services or through algorithms intended to update the databases after detecting malicious calls or spam calls. The database used for anti-spam services may also be updated with other databases that compile spam-generating callers, for example a database created from user reports via telephone numbers intended to compile identifiers of spam-generating callers, such as the French telephone number 33700.

These databases can be stored in support entities of the applications. These support entities are known as the "back-end" of the applications and can be located in centralized servers that are able to be interrogated remotely via a dedicated interface, such as the one used in the HTTP REST (for "Representational State Transfer") architecture. The support entities or back-end of an application contain data required for the application to operate. For example, for the anti-spam service to operate, the database listing call identifiers corresponding to spam-generating callers is consulted by the communication terminal when it receives an incoming call in order to check whether the identifier of the call is listed in the database. This anti-spam service may be implemented by the application managing the incoming or outgoing calls that is installed on the communication terminal.

In this type of anti-spam service, when a telephony terminal receives an incoming call, the anti-spam service checks whether the identifier or call number associated with the incoming call is contained in the database. If the call identifier is present in the database, the incoming call is classified as a malicious call or spam. The anti-spam service may thus reject this incoming call.

In various implementations of the anti-spam service, the incoming call may be rejected before the call is presented to the user or after the call has been presented to the user.

This type of anti-spam service is effective in many instances. However, for new numbers or call identifiers corresponding to spam, since these numbers or call identifiers are not listed in the database, the anti-spam service does not work. Thus, for example, in the case of spam numbers or call identifiers generated by robots, since these numbers or call identifiers are different each time they are generated, the database does not contain these numbers or call identifiers, and the spam is not detected. The anti-spam service is thus not useful in this case.

The disclosed technology aims to improve the detection of malicious calls or spam calls intended for a communication terminal.

SUMMARY

To this end, the disclosed technology proposes a method for managing an incoming call in a communication terminal, the incoming call having an associated call identifier.

In certain embodiments, a management method comprises:

checking the routing of an outgoing call to the call identifier associated with the incoming call, and classifying the incoming call on the basis of the result of the checking of the routing, the incoming call being classified as a malicious incoming call if the checking of the routing reveals that the outgoing call is not able to be routed.

Thus, for an incoming call, it is checked whether it is possible to establish communication, by way of an outgoing call, with the call identifier of the incoming call, in order to be able to determine whether the incoming call is a malicious call or spam call (or spam). The call identifier associated with the call, or call identifier of the incoming call, is a unique identifier for identifying the communication terminal making the call in a network. When, according to the result of the checking of the routing, an outgoing call to the call identifier associated with the incoming call is not able to be routed, the incoming call is classified as a malicious call or spam.

Once the incoming call has been classified, it may be handled, that is to say it may either be accepted if it is classified as not being a malicious call or spam, or rejected if it is classified as a malicious call or spam.

It will be noted that the call identifier associated with a spam call is not able to be routed. In other words, it is not possible to make a call to an identifier or call number associated with spam. Checking the routing thus makes it possible to determine whether or not the incoming call is spam.

By virtue of this method, an incoming call may be classified as spam without having to access databases listing call identifiers corresponding to spam. The spam detection may thus be performed quickly and effectively, even in the case of a new call identifier, generated for example by a robot, corresponding to spam.

According to certain embodiments, a management method furthermore comprises either rejecting the incoming call or maintaining the incoming call on the basis of the classification of said incoming call, the rejection being performed if the incoming call is classified as a malicious call.

The incoming call is thus rejected or maintained on the basis of the result of the checking of the routing.

In particular, the incoming call is rejected if the checking of the routing reveals that the outgoing call is not able to be routed. In other words, an incoming call having a call identifier to which an outgoing call is not able to be made is rejected.

It will be noted that the rejection of malicious calls may be performed without having to access databases listing call identifiers corresponding to spam. The spam rejection is thus performed automatically and effectively, even in the case of a new call identifier corresponding to spam.

Furthermore, the incoming call is maintained if the checking of the routing reveals that the outgoing call is able to be routed. According to various embodiments described below, the incoming call may be put on hold while the checking of the routing and the classification of the incoming call are being performed, or else it may be presented to the user of the communication terminal while the checking of the routing and the classification of the incoming call are being performed.

According to certain embodiments, checking of the routing comprises transmitting a request to check the outgoing call in order to determine whether the outgoing call is able to be routed.

According to certain embodiments, checking of the routing comprises checking information relating to the call identifier associated with the incoming call in a database listing all of the call identifiers authorized to use a communications network.

In one embodiment, checking of information relating to the call identifier follows the transmission of the request to check the outgoing call.

As indicated below, an outgoing call to a call identifier corresponding to spam is not able to be routed. Thus, in order to determine whether the outgoing call is able to be routed, it is for example checked whether the call identifier associated with the incoming call is present in a database containing the information relating to subscribers in a communications network. If the call identifier is present in the database, the outgoing call to this call identifier is able to be routed. If on the other hand the call identifier is not present in the database, the outgoing call to this call identifier is not able to be routed. Other information relating to the call identifier may be checked, such as the country of origin of the incoming call ("country code").

According to certain embodiments, a management method comprises receiving a message containing information representing either the possibility or the impossibility of routing the outgoing call.

For example, when the outgoing call is not able to be routed, the checking furthermore comprises receiving a message representing the impossibility of routing the outgoing call.

According to certain embodiments, a management method comprises, prior to said checking of the routing, consulting the presence of said call identifier in a database listing malicious call identifiers, the check being performed if the call identifier is not present in the database.

In this embodiment, before performing checking of the routing, the presence of the call identifier of the incoming call in a database listing call identifiers corresponding to spam (or spam database) is checked. If the call identifier is already present in the spam database, the incoming call is rejected. If the call identifier is not present in the database, for example for new spam, checking of the routing is performed.

This embodiment makes it possible to reduce the number of requests on the signaling network for checking whether call identifiers are able to be routed.

According to certain embodiments, a management method comprises delaying the presentation of said incoming call on said communication terminal, said delaying being implemented while the checking of the routing and the classification of the incoming call are being performed.

In other words, the incoming call is put on hold while the checking of the routing and the classification of the incoming call are being performed, the incoming call being presented once the checking of the routing and the classification of the incoming call have been completed.

Thus, the incoming call is not signaled on the communication terminal as long as the checking of the routing and the classification of the incoming call are being performed.

Therefore, in this embodiment, the user of the terminal is not made aware of the incoming call while waiting to check whether it is spam. By virtue of this feature, the spam detection is transparent to the user of the communication terminal. Specifically, since the incoming call is put on hold while the checking of the routing and the classification of the incoming call are being performed, if it turns out that the incoming call is spam, the incoming call is rejected without the user having received the incoming call.

In certain other embodiments, the presentation of the incoming call is not delayed while the checking of the routing and the classification of the incoming call are being performed.

In this case, the user himself/herself has to be careful and wait for the incoming call to be classified.

According to certain embodiments, a management method furthermore comprises generating a message indicating the performance of an operation of checking the incoming call.

The user of the mobile terminal is thus made aware that a spam check is being performed on an incoming call. This embodiment is particularly advantageous when the incoming call is not put on hold as long as the checking of the routing is being performed. Thus, since the user is made aware that a check is being performed on the incoming call, he/she may await the result of the check before possibly accepting the incoming call.

If the incoming call is put on hold while the check is being performed, the notification of the check serves to inform the user that the spam check is being performed even though the call is not presented to him/her. In this case, this notification is less important since the incoming call has not yet been presented to him/her. The user is simply informed that a checking operation is being performed, and may wait to possibly answer an incoming call.

According to other embodiments, performance of the checking of the routing of the outgoing call is not notified to the user.

This embodiment is advantageous in particular when the incoming call is not presented as long as the checking of the routing and the classification of the incoming call have not been completed. Spam is thus rejected in a manner completely transparent to the user.

According to one feature when the outgoing call is not able to be routed, the management method furthermore comprises generating a message indicating that a malicious call has been detected.

This message indicating the detection of a malicious call is purely informative.

The features of the management method presented below may be taken alone or in combination with one another.

According to a second aspect, the disclosed technology relates to a device for managing an incoming call in a communication terminal, the incoming call having an associated call identifier.

According to the disclosed technology, a management device comprises:

a routing checking module, configured so as to check the routing of an outgoing call to the call identifier associated with the incoming call, and a classification module configured so as to classify the incoming call on the basis of the result of the check performed by the checking module, the incoming call being classified as a malicious call if, according to the check, the outgoing call is not able to be routed.

According to certain embodiments, the management device furthermore comprises a decision module configured so as to decide to reject or to maintain the incoming call on the basis of said classification performed by the classification module.

Just as for the management method, the features of the management device presented below may be taken alone or in combination with one another.

According to another aspect, the disclosed technology relates to a communication terminal comprising a device for managing an incoming call according to the disclosed technology.

According to a fourth aspect, the disclosed technology relates to an interface device between two communication networks comprising a device for managing an incoming call according to the disclosed technology.

According to a fifth aspect, the disclosed technology relates to a computer program comprising a sequence of instructions for implementing the method for managing an incoming call according to the disclosed technology when it is loaded and executed by a processor.

According to a sixth aspect, the disclosed technology relates to a computer-readable information medium on which there is recorded a computer program comprising a sequence of instructions for implementing the management method according to the disclosed technology when it is loaded into and executed by a processor.

The management device, the communication terminal, the interface device, the computer program and the information medium have features and advantages that are analogous to those described above in relation to the method for managing an incoming call.

Other particular features and advantages of the disclosed technology will become more clearly apparent in the following description.

BRIEF DESCRIPTION OF THE DRAWINGS

The appended drawings are given by way of non-limiting examples. The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

DETAILED DESCRIPTION

The disclosed technology can be applicable to any communication device or terminal able to establish telephone-based communications with other communication devices or terminals.

This type of communication device or terminal is for example a mobile communication terminal, such as a mobile telephone, a tablet or a personal computer. The communication terminal may also be a landline telephony terminal.

Figure 1:
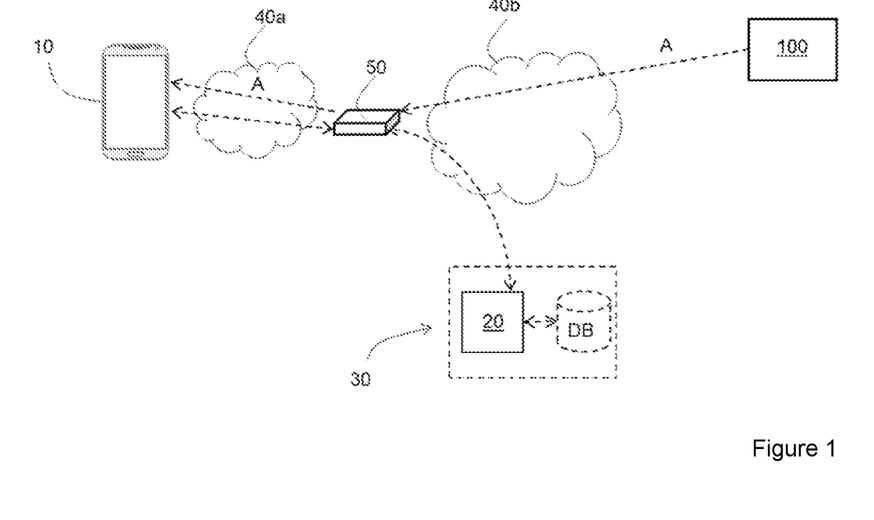
FIG. 1 shows a communication terminal receiving an incoming call and a device for managing an incoming call according to one embodiment.

FIG. 1 shows one example of an architecture able to implement a management method according to the disclosed technology. FIG. 1 in particular shows a communication terminal 10 receiving an incoming call A from a communication device 100, and a device 20 for managing incoming calls.

In the embodiment shown, the management device 20 forms part of the support entities 30 of the applications installed in the communication terminal 10. These support entities 30 may be known as the "back-end" of the applications.

As indicated above, the support entities 30 or back-end of an application contain data required for the application to operate.

In the embodiment shown, the management device 20 forms part of the support entities 30 of the applications on the communication terminal 10. The communication terminal 10 and the management device 20 are connected to one another via one or more communication networks 40a, 40b. In the embodiment shown, a gateway 50, such as a home gateway, allows the user terminal 10 to access the communication network 40b, such as the Internet.

In other embodiments, the management device is independent of the support entities 30 of the applications installed in the communication terminal 10. The management device may be integrated into a gateway 50 or interface device between two communication networks. It may for example be integrated into a home gateway intended to connect an access network to a packet-switched network, such as the Internet. In other embodiments, the management device may be integrated into equipment of a communication network, such as a switch or a router.

In other embodiments, the management device may be embedded in the communication terminal.

In some embodiments, the support entities comprise a database DB configured so as to list identifiers or call numbers corresponding to spam-generating callers. Since this database is optional, it is shown in dashed lines in FIG.

1. As will be described below, this database DB may be consulted in some embodiments of the disclosed technology.

In other embodiments, the support entities do not contain a database listing identifiers or call numbers corresponding to spam-generating callers.

As will be described below with reference to FIGS. 2, 3a and 3b, when the communication terminal 10 receives an incoming call A, it consults the management device 20 in order to ascertain whether or not the incoming call A is a malicious call and, on the basis thereof, indicate to the communication terminal 10 whether the incoming call A may be accepted or should be rejected.

In some embodiments, the management device 20 may consult the database DB. It will be noted that the consultation is optional and that, in other embodiments, a database is not used or is not present in the support entities 30.

Figure 2:
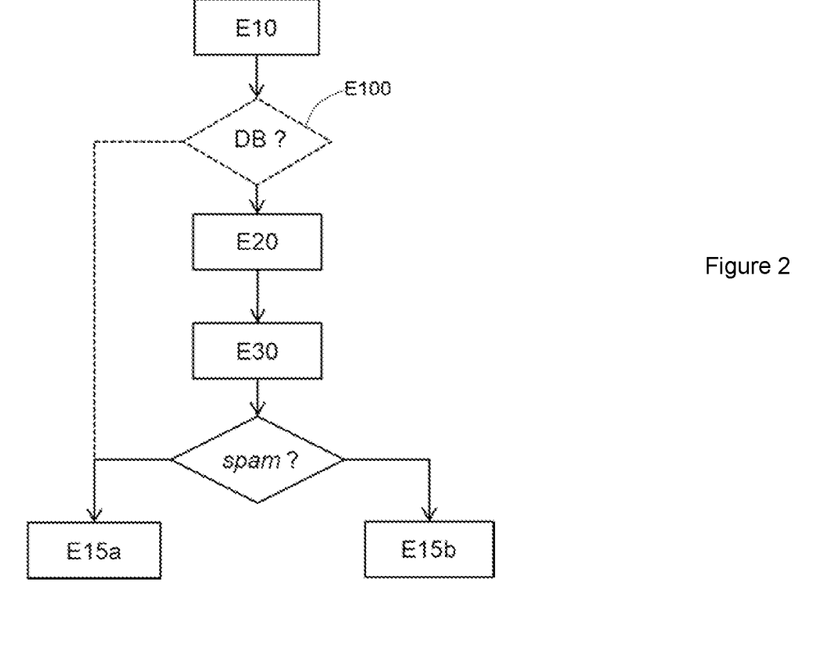
FIG. 2 illustrates steps of the management method according to one embodiment.

FIG. 2 illustrates steps of the method for managing an incoming call A in a communication terminal 10 according to one embodiment.

The management method is performed when an incoming call A is received E10 in the communication terminal 10. When the communication terminal 10 receives an incoming call A, the method for managing the incoming call A is performed in order to determine whether the incoming call A is a malicious call or spam.

The method for managing the incoming call A comprises checking the routing E20 of an outgoing call to a call identifier associated with the incoming call A. On the basis of the checking of the routing E20, the incoming call is classified E30 as a malicious or non-malicious call. If the outgoing call B is not able to be routed, the incoming call A is classified E30 as a malicious call or spam.

If the incoming call A is classified as a malicious call or spam, the incoming call A is rejected E15a. If on the other hand the incoming call A is not classified as spam, the incoming call A is accepted E15b.

In one embodiment, when the communication terminal 10 receives E10 an incoming call A, the management method comprises consulting E100 (shown in dashed lines) the presence of the call identifier associated with the incoming call A in a database DB (FIG. 1) listing malicious call identifiers. If, according to the consultation E100, the call identifier is contained in the database DB, the incoming call A is rejected E15a and the checking of the routing E20 is not performed. If, according to the consultation E100, the call identifier is not present in the database DB, the checking of the routing E20 is performed.

This embodiment makes it possible to reduce the number of requests transmitted on the signaling network for checking whether the call identifier associated with the incoming call A is able to be routed, that is to say for checking that a communication link is able to be established.

It will be noted that, in a first embodiment, the checking of the routing E20 is performed for any incoming call received in the communication terminal 10 and that, in a second embodiment, the checking of the routing E20 is performed only if the call identifier associated with the incoming call A is not listed in a database DB. In the first embodiment, it is not necessary to hold a database listing malicious call identifiers.

Figure 3A:
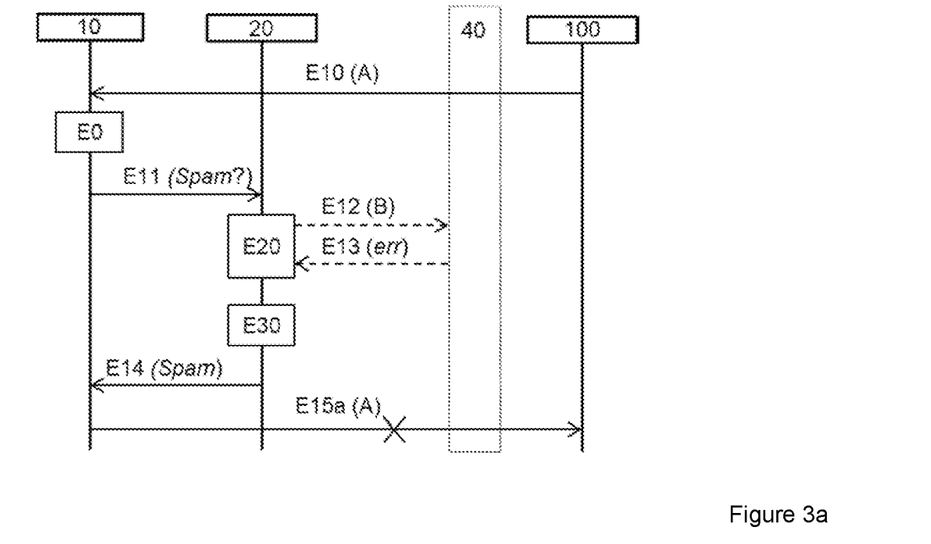
FIG. 3a illustrates steps of the management method according to one embodiment in the form of exchanges between entities, when the incoming call is a malicious call.
Figure 3B:
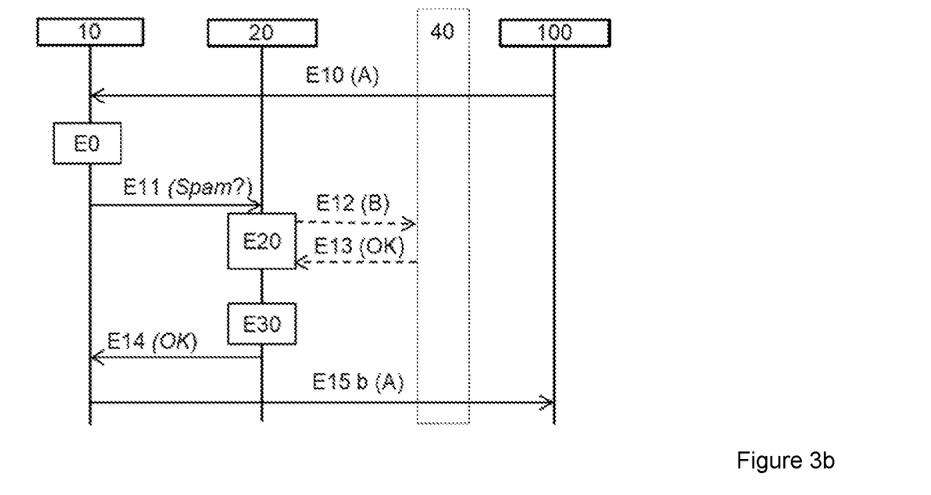
FIG. 3b illustrates steps of the management method according to one embodiment in the form of exchanges between entities, when the incoming call is not malicious.

FIGS. 3a and 3b illustrate, in the form of exchanges between the entities, steps of the method for managing an incoming call according to one embodiment. In particular, these figures show exchanges between the communication terminal 10, the device 20 for managing incoming calls and a calling communication terminal 100 making the incoming call to the communication terminal 10.

FIG. 3a shows steps of the management method that are performed when the communication terminal 10 receives a malicious incoming call A. FIG. 3b shows steps of the management method that are performed when the communication terminal 10 receives a non-malicious incoming call A.

It will be noted that, in the embodiment described, the management device 20 is external to the communication terminal 10.

In other embodiments that are not illustrated, the management device is integrated into the communication terminal. The management device may also be integrated into a gateway, such as a home gateway, or into equipment of a communication network, such as a switch or a router.

When the communication terminal 10 receives an incoming call A, here from a calling communication terminal 100, it is checked whether the incoming call A is a malicious call.

In one embodiment, the communication terminal 10 sends a checking request or command E11 to the management device 20, asking it to check whether the incoming call A is a malicious call or spam. In this checking request or command, the communication terminal 10 sends the call identifier of the incoming call A to the management device 20.

For example, the checking request is transmitted by the communication terminal 10 via an http REST interface.

By way of completely non-limiting example, the checking request may be of the following type:

"$ curl -d '{"cmd":"getSpamStatus","numbers": ["0600000001"], "token": "123456789"}' https://backend_antispam/api"

In this example, the call identifier of the incoming call A is the number "0600000001". With this checking request, the communication terminal 10 asks the management device 20 to check the routing of the call identifier "0600000001".

This checking request is of the http REST type. The parameters used in this checking request are known to a person skilled in the art. The parameters "cmd","getSpamStatus","numbers", "token": "123456789" are specific to http REST requests. The URL https://backend_antispam/api corresponds to an http POST request that is well known to a person skilled in the art.

Other types of request may of course be used. For example, when the communication terminal receives an incoming call, it may only send the call identifier to the management device.

In other embodiments, the management device may itself detect that the communication terminal is receiving an incoming call. In this embodiment, the management device performs the checking of the incoming call without the communication terminal having to send it a checking request (such as E11 in the embodiment shown) asking it to check whether the incoming call is a malicious call or spam.

In the embodiment shown, the management device 20 receiving this checking request performs checking of the routing E20 of an outgoing call B to the call identifier associated with the incoming call A.

In this embodiment, the management method comprises transmitting a request to check the outgoing call E12(B) in order to determine whether an outgoing call to the call identifier of the incoming call A is able to be made.

The request to check the outgoing call E12(B) is intended for an entity or server of the communication network 40 responsible for routing incoming calls to the communication terminal 10 and outgoing calls from the communication terminal 10.

In one embodiment, the request to check the outgoing call E12(B) is configured so as to check information relating to the call identifier associated with the incoming call A in a database (not shown) listing all of the call identifiers authorized to use a communications network 40.

For example, the request to check the outgoing call E12(B) is configured so as to check the presence of the call identifier in a database such as HLR (for "Home Location Register") when the communications network 40 is a mobile network, or in a database such as HSS (for "Home Subscriber Server") when the communications network 40 is a landline network.

If the call identifier is present in the HLR or HSS database or the like, an outgoing call to this call identifier is able to be routed. If on the other hand the call identifier is not present in the database, the outgoing call to this call identifier is not able to be routed.

Of course, the checking of the routing E20 may be performed according to different embodiments, and in particular depending on the type of call identifier whose routing will be checked.

For example, if the call identifier corresponds to that of a subscriber to a landline or mobile communication network using IMS (for "IP Multimedia Subsystem") technology, the management device 20 may transmit a request to check the outgoing call to the calling communication terminal 100 via the communication network 40 (or communication networks 40*a*, 40*b*). Such a request may for example be a SIP OPTIONS request. This request is used to silently check whether the outgoing call to an intended recipient (having an associated call identifier) is able to be routed.

One example of a SIP OPTIONS request is as follows:
"OPTIONS sip:carol@ims.com SIP/2.0
Via: SIP/2.0/UDP ims.com;branch=z9hG877
Max-Forwards: 70
To: <sip: 0600000001@ims.com>
From: <sip: 0600000000@ims.com>; tag=123
Call-ID: a84b4c76e66710
CSeq: 63104 OPTIONS
Accept: application/sdp
Content-Length: 0"

Where "0600000001" is the call identifier associated with the outgoing call whose routing is checked. In other words, with this SIP request, the management device 20 checks the routing of an outgoing call to the call identifier "0600000001".

If routing is impossible, the management device 20 receives E12 an "unallocated number", "no route to network", "no route to destination" error message err or the like (FIG. 3*a*) from the communication network 40, in particular from an entity of the communication network 40*a*, 40*b* that interrogated the HLR or HSS databases, in response to this request.

If routing is possible, the management device 20 receives, in response to this request, a message indicating that the call identifier is able to be routed. By way of completely non-limiting example, the response may take the following form:
"SIP/2.0 200 OK
Via: SIP/2.0/UDP ims.com;branch=z9hG877
To: <sip: 0600000001@ims.com>>;tag=123
From: <sip: 0600000000@ims.com>;tag=123 Call-ID: a84b4c76e66710
CSeq: 63104 OPTIONS
Allow: INVITE, ACK, CANCEL, OPTIONS, BYE
Content-Length: 0"

Where "200 OK" means that the call identifier is able to be routed (FIG. 3*b*).

If for example the call identifier corresponds to a mobile communication network 40, the management device 20 may transmit a request in accordance with the MAP (for "Mobile Application Part") protocol governing all of the exchanges between equipment of the mobile network 40, such as a "MAP_SEND_ROUTING_INFORMATION" request, in order to interrogate the HLR (for "Home Location Register") and the VLR (for "Visitor Location Register") in order to check the routing information of the call identifier.

If the call identifier is not able to be routed, the entity that interrogated the HLR or VLR databases responds to the management device 20 with a MAP error, such as "Unknown Subscriber".

According to another embodiment, the checking of the routing may be performed by consulting a database held by the telephony operator listing unassigned numbers or call identifiers. Thus, if the call identifier of the incoming call is present in this database, the management device 20 receives a message telling it that the call identifier of the incoming call is not assigned. In this case, the incoming call is classified as spam.

Of course, the checking of the routing may be performed using other means. For example, using services such as "VLR lookup" or the like offered by service providers not belonging to the telephony operator, these third-party services making it possible to check whether a call identifier is valid or is not valid.

Of course, other means may be used to check the outgoing call routing. For example, in communications performed by point-to-point connections, in the event of it being impossible to establish a connection to a remote point, it is considered that the remote point is not reachable and is therefore not able to be routed. In other words, an outgoing call to the remote point is not able to be routed.

It will be noted that an outgoing call is not able to be routed if it is not possible to establish communication with a communication terminal using the call identifier associated with the outgoing call.

Thus, if the outgoing call B is not able to be routed (case in FIG. 3*a*), the management device 20 receives E13 an error message err representing the impossibility of routing the outgoing call B. This error message err is generated by different entities depending on the type of communication network 40 that is used.

The incoming call A is classified E30 depending on the result of the check E20.

In this classification, if the outgoing call B is not able to be routed, the incoming call A is classified as a malicious incoming call (case in FIG. 3*a*). If on the other hand the outgoing call B is able to be routed (case in FIG. 3*b*), the incoming call A is classified E30 as a non-malicious incoming call A.

In this embodiment, the method comprises receiving a message containing information representing the impossibility of routing the outgoing call B.

In some embodiments, the method comprises receiving a message containing information representing either the possibility or the impossibility of routing said outgoing call (B).

In this embodiment, the management device always receives a message informing it whether routing of the outgoing call is able to be performed or whether, on the other hand, it is not able to be performed.

In the embodiment shown, once the classification E30 has been performed, the management device 20 sends E14 a message including the classification of the incoming call A to the communication terminal 10.

Picking up on the above example of a checking request, the message including the classification of the incoming call A sent E14 to the communication terminal 10 may be in JSON (for "JavaScript Object Notation") format and may take the following form:

```
{
"status":"OK",
"result":{
   "0600000001":{
      "isSpam":true
   }
}
}
```

In this example, the incoming call with the call identifier "0600000001" is classified as spam (FIG. 3a). Of course, the format of the messages including the classification may be different.

The communication terminal 10, upon receiving the message including the classification of the incoming call, either rejects E15a (FIG. 3a) or accepts E15b (FIG. 3b) the incoming call A. The communication terminal 10 thus either rejects E15a (FIG. 3a) or accepts E15b (FIG. 3b) the incoming call A on the basis of the result of the classification E30 of the incoming call A.

Thus, by virtue of a management method according to the disclosed technology, the incoming call A is rejected when a communication channel is not able to be established between the communication terminal 10 receiving an incoming call A (FIG. 3a) and the communication terminal 100 making the incoming call A. On the contrary, the incoming call A is accepted when a communication channel is able to be established between the communication terminal 10 receiving an incoming call A and the communication terminal 100 making the incoming call A.

It will be noted that, in this embodiment, the communication terminal 10 makes the decision to maintain or to reject the incoming call on the basis of the result of the classification.

In one embodiment that is not shown, the decision to reject or to accept the incoming call on the basis of the classification E30 of the call identifier is made by the management device 20 itself. According to some embodiments, the management device may send a request to the communication terminal asking it to maintain or to reject the incoming call. According to other embodiments, the management device may itself maintain or reject the incoming call to the communication terminal.

In some embodiments, the result of the classification of the incoming call is recorded in the history of incoming and outgoing calls to and from the communication terminal. The user may thus consult his/her history for call identifiers associated with incoming calls that have been classified as being malicious or spam.

In embodiments such as those shown in FIGS. 3a and 3b, when the incoming call A is received by the communication terminal 10, it is put on hold E0 as long as the checking of the routing E20 and the classification E30 are being performed.

According to some embodiments, the incoming call A is put on hold E0 before the incoming call A is signaled or presented on the communication terminal 10. In other words, the signaling of the incoming call A is deferred or delayed until the incoming call A has been classified E30.

In this embodiment, the user of the communication terminal 10 is not alerted about the incoming call A as long as the checking E20 and the classification E30 of the incoming call A have not been performed, that is to say as long as the management device 20 does not know whether or not the call is malicious.

In this embodiment, the checking of the incoming call A is performed in a manner transparent to the user of the communication terminal 10, the user not even being alerted about the reception of a malicious call.

It will be noted that, when the incoming call A is classified as a malicious incoming call (FIG. 3a), it is rejected without being presented to the user, for example via the interface of the call management application.

In other embodiments that are not shown, the incoming call, rather than being put on hold, is signaled to the user of the communication terminal while the checking and the classification are being performed. In these embodiments, the management method may furthermore comprise generating a message indicating the performance of checking of the incoming call.

Thus, in this embodiment, the user is informed of the reception of an incoming call, but he/she is made aware that the incoming call is being checked. The user may thus wait for the incoming call to be rejected or maintained before possibly accepting the incoming call.

Independently of putting the incoming call A on hold E0, the management method may furthermore comprise generating a message indicating the performance of checking E20 of the incoming call A.

Thus, in one embodiment in which the method comprises putting the incoming call A on hold E0 while the checking E20 and the classification E30 are being performed, the management method may furthermore comprise generating a message indicating the performance of an operation of checking the incoming call A.

In this embodiment, the user is informed of the fact that his/her communication terminal 10 has received an incoming call A and that checking of this incoming call A is being performed.

If the management method does not comprise generating a message indicating the performance of an operation of checking the incoming call A, an incoming spam call is rejected in a manner completely transparent to the user. The incoming spam call may be rejected by the management device or by the communication terminal, for example by the application for managing incoming and outgoing calls.

In some embodiments, when an incoming call A is rejected, as shown in FIG. 3a, the management method furthermore comprises generating a message indicating that a malicious incoming call has been detected, this message being intended for the user and being displayed for example via the interface of the call management application. By virtue of this message, the user is informed that a malicious incoming call has been detected and rejected. This message may be generated by the management device 20 or by the communication terminal 10 itself.

The management method may also comprise generating a message indicating that the incoming call is not malicious.

It will be noted that the generated message indicates the result of the classification of the incoming call.

In some embodiments, the user may himself/herself reject an incoming call in light of receiving a message indicating that a malicious incoming call has been detected, or maintain the incoming call in light of receiving a message indicating that the incoming call is not malicious.

Figure 4A:
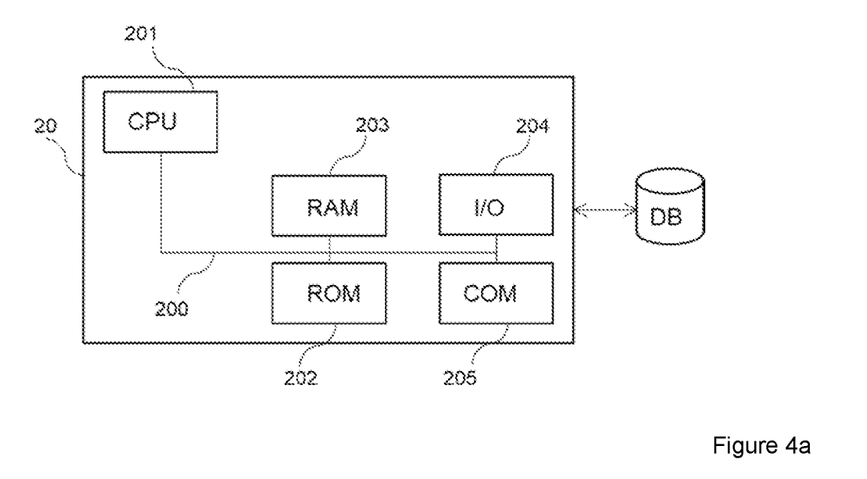
FIG. 4a illustrates a hardware architecture able to implement the management method.

FIG. 4a schematically illustrates a hardware architecture of a management device 20 able to perform a management method according to the disclosed technology.

The management device 20 comprises a communication bus 200 to which the following are connected:

a processing unit 201, called CPU (for "central processing unit") in the figure and possibly comprising one or more processors;

a non-volatile memory 202, for example a ROM (for "read-only memory"), an EEPROM (for "electrically erasable programmable read-only memory") or a flash memory;

a random access memory 203 or RAM;

an input/output interface 204, called I/O in the figure, for example keys or buttons, a screen, a keypad, a mouse or another pointing device such as a touchscreen or a remote controller allowing a user to interact with a management device 20 via a graphical interface or a human-machine interface; and a communication interface 205, called COM in the figure, designed to exchange data for example with the communication terminal 10 or with a database DB via a communication network 40a, 40b.

The random access memory 203 contains registers designed to record variables and parameters that are created and modified during the execution of a computer program comprising instructions for implementing a management method according to the disclosed technology. The instruction codes of the program stored in the non-volatile memory 202 are loaded into the RAM memory 203 in order to be executed by the processing unit CPU 201.

The non-volatile memory 202 is for example a rewritable EEPROM memory or flash memory able to constitute a medium within the meaning of the disclosed technology, that is to say able to comprise a computer program comprising instructions for implementing a management method according to the disclosed technology. The rewritable memory may comprise for example a database listing malicious call identifiers. This database may be updated on a rolling basis as malicious call identifiers are identified.

Figure 4B:
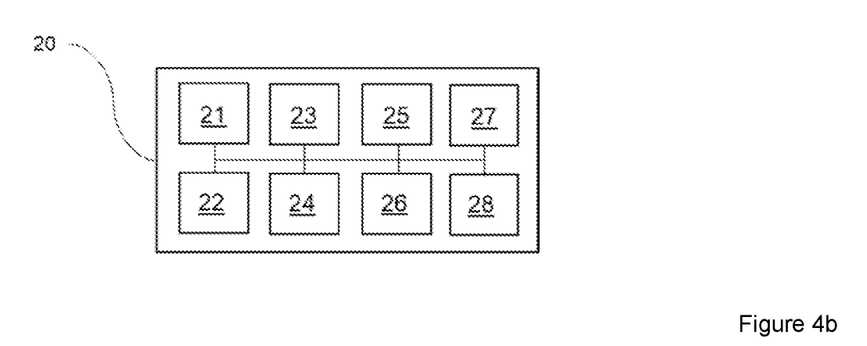
FIG. 4b is a functional depiction of a management device according to one embodiment.

This program, by way of its instructions, defines functional modules of the management device 20 that are implemented and/or control the hardware elements described above. FIG. 4b is a functional depiction of a device 20 for managing an incoming call A according to one embodiment.

These modules comprise in particular:

a routing checking module 21, configured so as to check E20 the routing of an outgoing call B to the call identifier associated with the incoming call A, and a classification module 22 configured so as to classify E30 the incoming call A on the basis of the result of the check E20 performed by the checking module 21, the incoming call A being classified as a malicious call if, according to the check E20, the outgoing call B is not able to be routed.

The management device 20 may furthermore comprise, depending on embodiments:

a decision module 23 configured so as to decide to reject or to maintain the incoming call A on the basis of the classification E30 performed by said classification module 22, a transmission module 24 configured so as to transmit a request to check the outgoing call in order to check whether the outgoing call B to the call identifier associated with said incoming call A is able to be routed, a reception module 25 configured so as to receive a message representing the possibility or the impossibility of routing said outgoing call B, a consultation module 26 configured so as consult E100, prior to the checking of the routing E20, the presence of the call identifier in a database DB listing malicious call identifiers, a module 27 configured so as to put the incoming call A on hold or delay it E0 before signaling the incoming call A on the communication terminal 10 while the checking of the routing E20 is being performed, a message generation module 28 configured so as to generate a message E14 indicating the performance of the checking of the routing 20 and/or a message indicating that a malicious incoming call has been detected and/or a message indicating that the incoming call is not malicious.

The abovementioned modules and means are driven by the processor of the processing unit 201. They may take the form of a program able to be executed by a processor, or a hardware form, such as an application-specific integrated circuit (ASIC), a system on chip (SoC), or a programmable logic circuit-type electronic component, such as an FPGA (for "field-programmable gate array") component.

The communication terminal 10 also comprises a communication bus to which there are connected a processing unit or microprocessor, a non-volatile memory, a random access memory or RAM, and a communication interface designed in particular to exchange data with the management device 20. The communication terminal 10 may for example inform the management device 20 that it has received an incoming call A and send it a command/request to check the incoming call A. The communication terminal 10 may furthermore receive messages from the management device 20, for example in order to inform it of the classification of the incoming call A.

In one embodiment, the communication terminal 10 comprises a decision module (not visible in the figures) configured so as to decide to reject or to maintain the incoming call on the basis of said classification E30 performed by said classification module 22 of the management device 20.

In some embodiments, the management device 20 is integrated into the communication terminal 10.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the disclosed technology has been described in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A method for managing an incoming call in a communication terminal, the communication terminal receiving the incoming call from a calling communication terminal, said incoming call having an associated call identifier identifying the calling communication terminal, wherein the method is implemented by a device for managing and comprises:
   checking a routing of an outgoing call to the call identifier associated with the incoming call, and
   classifying the incoming call on the basis of the result of the checking of the routing, the incoming call being classified as a malicious incoming call upon determining that the outgoing call is not able to be routed.

2. The method of claim 1, further comprising either rejecting the incoming call or maintaining the incoming call on the basis of the classification of the incoming call the incoming call being rejected upon a classification of the incoming call as a malicious call.

3. The method of claim 1, wherein checking the routing comprises transmitting a request to check the outgoing call in order to determine whether the outgoing call is able to be routed.

4. The method of claim 1, wherein checking the routing comprises checking information relating to the call identifier associated with the incoming call in a database listing all call identifiers authorized to use a communications network.

5. The method of claim 1, comprising, prior to checking the routing, consulting the presence of the call identifier in a database listing malicious call identifiers, the check being performed if the call identifier is not present in the database.

6. The method of claim 1, further comprising delaying the presentation of the incoming call on the communication terminal, the delaying being implemented while the checking of the routing and the classification of the incoming call are being performed.

7. A computer comprising a processor and a memory, the memory having stored thereon instructions which, when executed by the processor, cause the computer to implement the method of claim 1.

8. A non-transitory computer-readable medium having stored thereon instructions which, when executed by a processor, cause the processor to implement the method of claim 1.

9. A device for managing an incoming call in a communication terminal, the communication terminal receiving the incoming call from a calling communication terminal, said incoming call having an associated call identifier identifying the calling communication terminal, the device comprising a processor configured to:
   check a routing of an outgoing call to the call identifier associated with the incoming call, and
   classify the incoming call on the basis of the result of the checking of the routing performed by the processor, the incoming call being classified as a malicious call upon a determination that the outgoing call is not able to be routed.

10. A communication terminal comprising the device of claim 9.

11. An interface device between two communication networks, the interface device comprising the device of claim 9.

* * * * *